United States Patent Office 3,304,321
Patented Feb. 14, 1967

3,304,321
PROCESS FOR HYDROXYLATING TRIORGANO-
SILOXYLATED SILOXANES
Charles W. Lentz, Midland, Mich., assignor to Dow Corning Corporation, Midland, Mich., a corporation of Michigan
No Drawing. Filed Aug. 28, 1963, Ser. No. 305,192
19 Claims. (Cl. 260—448.2)

This invention relates to a process for hydroxylating triorganosiloxylated siloxanes. More specifically, this invention relates to a process for replacing trialkylsiloxy or trihaloalkylsiloxy groups in siloxanes with hydroxyl groups.

It has been found in accordance with this invention that when a triorganosiloxylated siloxane is reacted with a cataylst selected from the group consisting of aluminum chloride, titanium tetrachloride and sulfuric acid and then the product of this reaction is hydroylzed, a product is obtained in which one or any number of the triorganosiloxy groups of the siloxane have been replaced by hydroxyl groups.

The process of this invention is particularly useful for hydroxylating completely trimethylsiloxylated siloxanes. The process of this invention is also useful in analyzing the number of trimethylsiloxy groups put on the surface of fillers when they are treated. Other uses of the process of this invention will be obvious to those skilled in the art from the foregoing description of the invention as well as from the following, more detailed, description and examples.

The temperature at which the process of this invention is carried out is not particularly critical. Generally speaking, the reaction is carried out at about room temperature or below, that is, at a temperature below about 30° C. It is usually preferable to carry out the reaction at a temperature below about 10° C. because the reaction tends to be exothermic and also because the lower temperature tends to prevent condensation of the silicon-bonded hydroxyl groups produced during the reaction.

The relative amounts of the catalyst and siloxane employed can vary over a considerable range. Thus, for example, the amount of catalyst employed can range from less than an equimolar amount to several times an equimolar amount. However, it is generally preferable to employ one mole of catalyst per mole of $SiO_{4/2}$ structure (i.e., per mole of unsubstituted silicon) in the siloxane since this ratio appears to give the best overall results.

The reaction time basically effects the yield obtained. otherwise, there is no particualrly critical reaction time involved. Satisfactory results can be obtained in either relatively short times, say 30 minutes or less, or in relatively long times, say a few days.

In hydrolyzing the reaction product a cold aqueous HCl solution is generally employed. The HCl is not essential to the hydrolysis but is merely employed to prevent precipitation of any salts that may be formed. Hydrolysis can also be accomplished by pouring the reaction product onto ice or into an ice-water mixture.

As a matter of convenience and for ease of handling, the process of this invention is preferably carried out in a suitable solvent. However, when the starting siloxane is a liquid, the use of a solvent is not essential although still helpful.

The triorganosiloxylated siloxanes that can be hydroxylated employing the process of this invention include any siloxane containing $R_3SiO$-groups wherein each R is a radical independently selected from the group consisting of alkyl and haloalkyl radicals. Of course, the $R_3SiO$- groups are attached to the siloxane via Si-O-Si bonds.

The R radicals can be any alkyl or haloalkyl radicals. Illustrative of the alkyl and haloalkyl radicals represented by R are the methyl, ethyl, propyl, isopropyl, butyl, tertiary butyl, amyl, hexyl, octyl, decyl, dodecyl, octadecyl, myricyl, chloromethyl, 3,3,3-trifluoropropyl, chloroisobutyl and the 3-bromopropyl radicals.

Siloxanes that are particularly useful in the process of this invention are those which are completely triorganosiloxylated, the completely trimethylsiloxylated siloxanes being the most preferred compounds. These compounds can be represented by the respective formulae

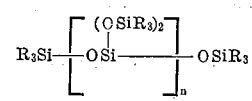

and

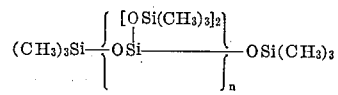

wherein R has the above defined meaning and n is an integer.

For purposes of illustration, the reactions that take place in the process of this invention can be represented by the following equations:

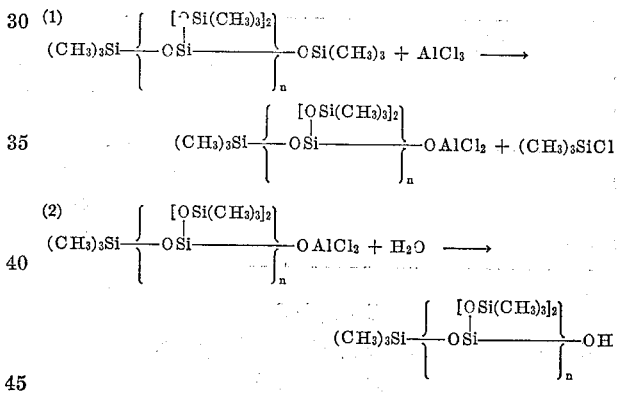

In order that those skilled in the art can better understand how the present invention can be practiced, the following examples are given by way of illustration and not by way of limitation.

*Example 1*

This example shows the effect of varying the amount of catalyst (aluminum chloride) used and the reaction times.

Five runs were made using the following procedure. A mixture of 10 ml. (.0225 mol) of $[(CH_3)_3SiO]_4Si$ and 10 ml. of toluene was placed in a 1 ounce glass vial and cooled to $-10$ to $-15°$ C. Then the desired weight of aluminum chloride was added, the vial capped and the mixture shaken for 2 minutes, and then the mixture was allowed to stand. The mixture was then hydrolyzed by pouring it into 30 ml. of cold 10 percent HCl, shaken for 30 seconds, separated, then washed twice more with 10 percent HCl, then washed twice with water, then contacted with calcium oxide for one minute and finally filtered. The filtered product was then analyzed by gas-liquid chromatographic analysis to determine the ratio of $[(CH_3)_3SiO]_3SiOH$ to $[(CH_3)_3SiO]_4Si$. The amounts of aluminum chloride, the reaction times and the results are set forth in the table below.

| Mole Ratio AlCl₃ to [(CH₃)₃SiO]₄Si | Reaction Time | [(CH₃)₃SiO]₃SiOH to [(CH₃)₃SiO]₄Si Ratio |
|---|---|---|
| 0.75 | 83 minutes | 1.4 |
| 0.90 | 92 minutes | 1.55 |
| 1.0 | 100 minutes | 1.63 |
| 1.2 | 112 minutes | 2.70 |
| 1.5 | 11 hours 13 minutes | 2.30 |

*Example 2*

This example also shows the effect of varying the amount of catalyst (aluminum chloride) used.

Five runs were made using the following procedure. A mixture of 13.6 g. (0.224 mole) of

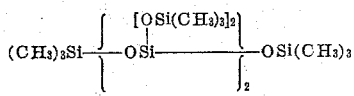

and 10 ml. of toluene was placed in a small bottle and cooled to about −10° C. Then the appropriate quantity of aluminum chloride was added and the mixture stirred with a thermometer. The temperature was maintained below +10° C. throughout the process. The bottle was capped and shaken intermittently for about 45 minutes. The mixture was then hydrolyzed by pouring it into 40 ml. of cold 10 percent HCl, shaken, separated, then washed twice more with 10 percent HCl, then washed twice with water, filtered, weighed and then analyzed by gas-liquid chromatographic analysis. The amounts of aluminum chloride and the results are set forth in the table below.

TABLE

| Mole Ratio AlCl₃ to (CH₃)₃Si–[–OSi([OSi(CH₃)₃]₂)–]₂–OSi(CH₃)₃ | Percent Yield as H–[–OSi([OSi(CH₃)₃]₂)–]₂–OH | Percent Yield as (CH₃)₃Si–[–OSi([OSi(CH₃)₃]₂)–]₂–OH |
|---|---|---|
| 1.0 | 19.2 | 39.2 |
| 1.5 | 28.3 | 40.1 |
| 2.0 | 50.0 | 32.1 |
| 2.5 | 52.6 | 18.8 |
| 3.5 | 30.3 | 23.2 |

*Example 3*

465 g. of hexakis(trimethylsiloxy)disiloxane, $$\{[(CH_3)_3SiO]_3Si\}_2O$$

was dissolved in 500 ml. of toluene, placed in a three liter flask and cooled to 2° C. Then 112 g. of AlCl₃ was added over a period of about 7 minutes, a maximum temperature of 9° C. being reached during the addition. The mixture was stirred an additional 5 minutes and then added to one liter of 10 percent HCl over a period of about 10 minutes, a maximum temperature of 10° C. being reached during the addition to the HCl. The solution was then washed two more times with cold 10 percent HCl (5 minutes each) and then twice with water. Finally the mixture was treated with CaO and then filtered through filter aid.

The above procedure was repeated and then the two toluene solutions obtained were combined. The toluene solution was azeotroped yielding 4 to 5 ml. of water and then stripped to remove the toluene. The remaining liquid was filtered and then fractionated into four cuts of 100 ml., 50 ml., 50 ml. and 15 ml. By gas-liquid chromatographic analysis they contained 78 percent, 72 percent, 55 percent and 51 percent, respectively, of $$[(CH_3)_3SiO]_3SiOSi(OH)[OSi(CH_3)_3]_2$$

The four cuts were combined for refractionation. 135 g. (about 100 cc.) of [(CH)₃SiO]₃SiOSi(OH)[OSi(CH₃)₃]₂ was obtained at a temperature of 88–89° C. and about .15 mm. of pressure.

*Example 4*

100 ml. of toluene, 100 ml. (.225 mol) of $$[(CH_3)_3SiO]_4Si$$

and 12.25 ml. (.112 mol) of titanium tetrachloride were placed in a 500 ml. flask and allowed to react for 46.5 hours at room temperature. The mixture was then hydrolyzed with a 10 percent HCl solution, washed twice with water, dried, and then analyzed by gas-liquid chromatographic analysis. The analysis showed that the product contained 11.3 percent of [(CH₃)₃SiO]₃SiOH.

*Example 5*

This example shows the effect of time on the reaction.

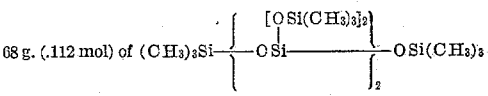

50 ml. of toluene and 18.5 ml. (.169 mol) of titanium tetrachloride were mixed at room temperature. Periodically a sample of the mixture was removed, hydrolyzed with a 10 percent HCl solution, washed, filtered and then analyzed by gas-liquid chromatographic analysis to determine the amount of starting siloxane converted to hydroxylated product. The results are set forth in the table below.

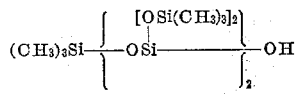

Reaction time:
- 40 minutes, percent _____ 58
- 110 minutes, percent _____ 74
- 3 hours, percent _____ 75
- 23 hours, percent _____ 74

*Example 6*

10 ml. (.225 mol) of [(CH₃)₃SiO]₄Si were mixed with 10 ml. of toluene in a bottle and cooled to −10° C. Then 0.7 ml. (.0169 mol) of 97 percent sulfuric acid was added to the bottle. The mixture was shaken intermittently for one hour, the temperature being maintained at 0–10° C. during this time. The mixture was hydrolyzed and then analyzed. Gas-liquid chromatographic analysis showed that 3.2 percent of [(CH₃)₃SiO]₃SiOH had been formed.

*Example 7*

When the siloxanes specified below are substituted for the siloxanes in the processes of Examples 3 or 4, in equimolar amounts, the indicated products are obtained.

Siloxane (1)

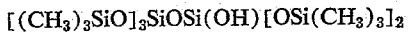

Product (1)

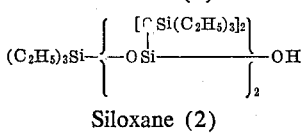

Siloxane (2)

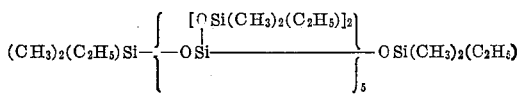

Product (2)

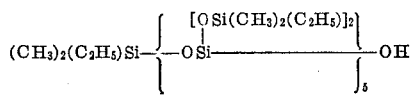

Siloxane (3)

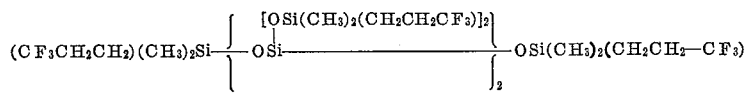

Product (3)

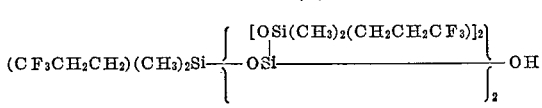

Siloxane (4)

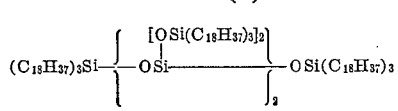

Product (4)

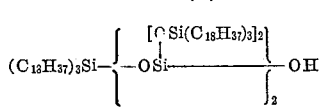

That which is claimed is:

1. A process for hydroxylating triorganosiloxylated siloxanes which comprises the steps of
   (1) reacting a triorganosiloxylated siloxane with a catalyst selected from the group consisting of aluminum chloride, titanium tetrachloride and sulfuric acid,
   (2) hydrolyzing the reaction product and
   (3) recovering the hydroxylated product.

2. The process of claim 1 wherein the catalyst is aluminum chloride.

3. The process of claim 1 wherein the catalyst is titanium tetrachloride.

4. The process of claim 1 wherein the catalyst is sulfuric acid.

5. A process for hydroxylating triorganosiloxylated siloxanes which comprises the steps of
   (1) reacting a triorganosiloxylated siloxane having the general formula

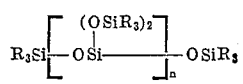

wherein each R is a radical independently selected from the group consisting of alkyl and haloalkyl radicals and n is an integer, with a catalyst selected from the group consisting of aluminum chloride, titanium tetrachloride and sulfuric acid,
   (2) hydrolyzing the reaction product and
   (3) recovering the hydroxylated product.

6. The process of claim 5 wherein the catalyst is aluminum chloride.

7. The process of claim 5 wherein the catalyst is titanium tetrachloride.

8. The process of claim 5 wherein the catalyst is sulfuric acid.

9. A process for hydroxylating triorganosiloxylated siloxanes which comprises the steps of
   (1) reacting a triorganosiloxylated siloxane having the general formula

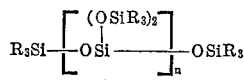

wherein each R is a radical independently selected from the group consisting of the methyl, ethyl and 3,3,3-trifluoropropyl radicals and n is an integer, with a catalyst selected from the group consisting of aluminum chloride, titanium tetrachloride and sulfuric acid,
   (2) hydrolyzing the reaction product and
   (3) recovering the hydroxylated product.

10. The process of claim 9 wherein the catalyst is aluminum chloride.

11. The process of claim 9 wherein the catalyst is titanium tetrachloride.

12. The process of claim 9 wherein the catalyst is sulfuric acid.

13. A process for hydroxylating triorganosiloxylated siloxanes which comprises the steps of
    (1) reacting a triorganosiloxylated siloxane having the general formula

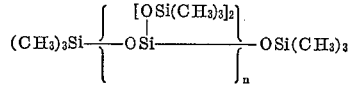

wherein n is an integer, with a catalyst selected from the group consisting of aluminum chloride, titanium tetrachloride and sulfuric acid,
    (2) hydrolyzing the reaction product and
    (3) recovering the hydroxylated product.

14. The process of claim 13 wherein the catalyst is aluminum chloride.

15. The process of claim 13 wherein the catalyst is titanium tetrachloride.

16. The process of claim 13 wherein the catalyst is sulfuric acid.

17. A process for hydroxylating the siloxane

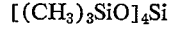

which comprises the steps of
    (1) reacting the siloxane with a catalyst selected from the group consisting of aluminum chloride, titanium tetrachloride and sulfuric acid,
    (2) hydrolyzing the reaction product and
    (3) recovering the hydroxylated product

18. The process of claim 17 which is carried out at room temperature or below.

19. A process for hydroxylating the siloxane

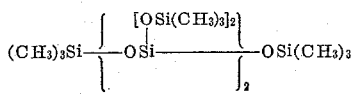

which comprises the steps of
(1) reacting the siloxane with a catalyst selected from the group consisting of aluminum chloride, titanium tetrachloride and sulfuric acid,
(2) hydrolyzing the reaction product and
(3) recovering the hydroxylated product

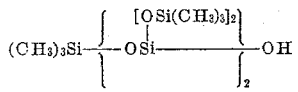

No references cited.

HELEN McCARTHY, *Acting Primary Examiner.*

P. F. SHAVER, *Assistant Examiner.*